No. 622,872. Patented Apr. 11, 1899.
J. I. THORNYCROFT.
APPARATUS FOR CONDENSING STEAM.
(Application filed Dec. 22, 1897.)
(No Model.) 5 Sheets—Sheet 1.

Attest:
T. F. Kehoe.
J. H. Graves.

Inventor
John Isaac Thornycroft
By Philipp Phelps & Sawyer
Attys

THE NORRIS PETERS CO., PHOTO-LITHO., WASHINGTON, D. C.

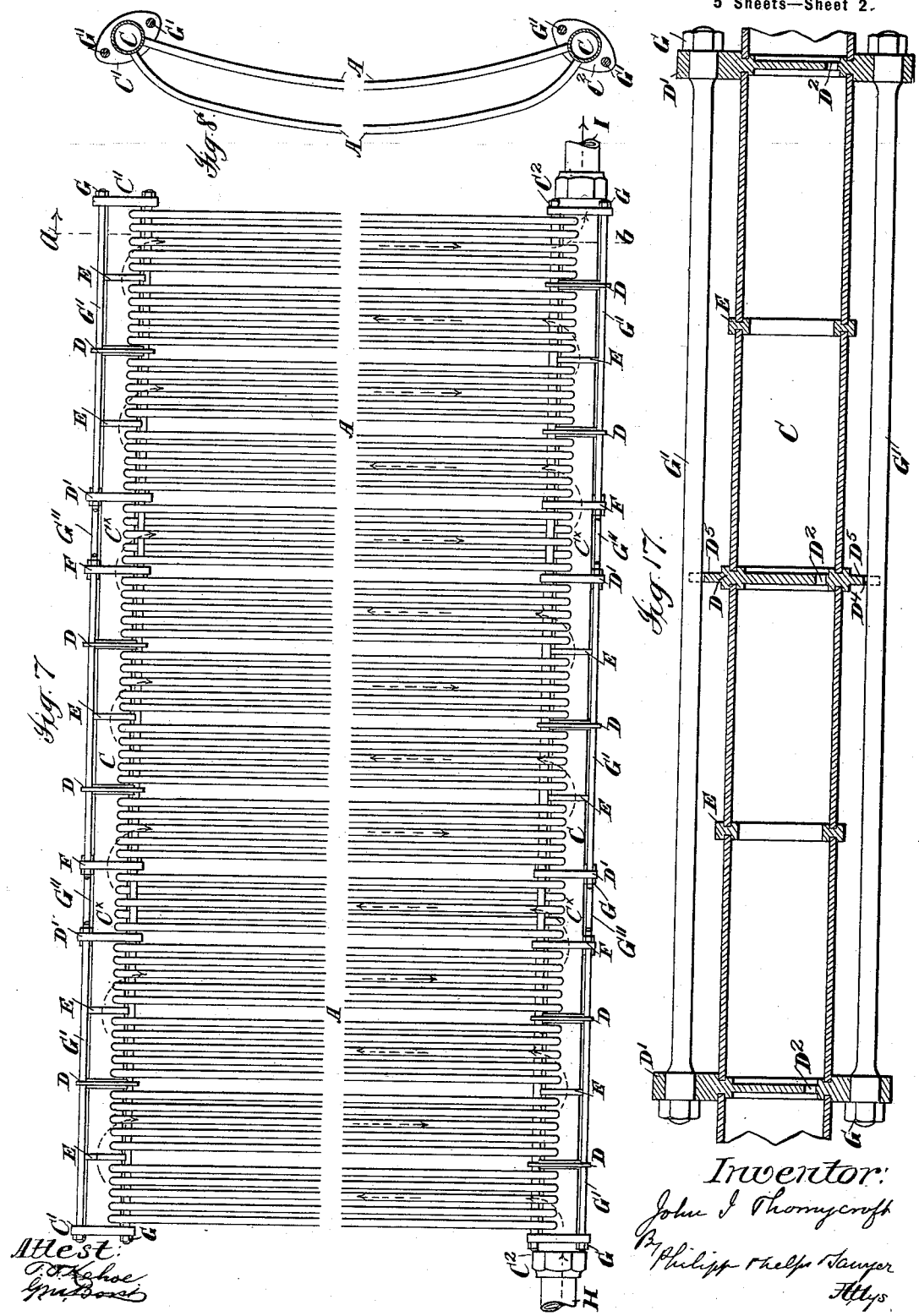

No. 622,872. Patented Apr. 11, 1899.
J. I. THORNYCROFT.
APPARATUS FOR CONDENSING STEAM.
(Application filed Dec. 22, 1897.)
(No Model.) 5 Sheets—Sheet 3.
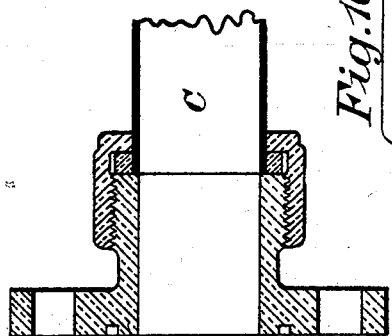
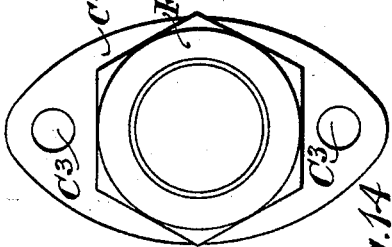
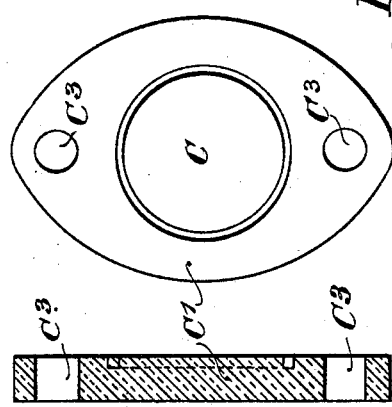
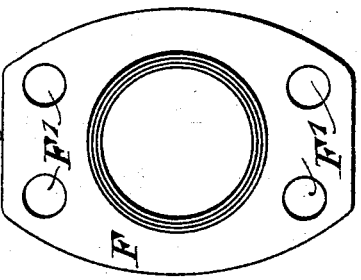
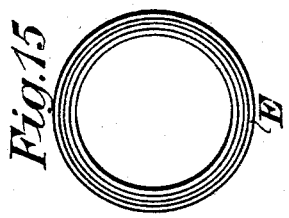
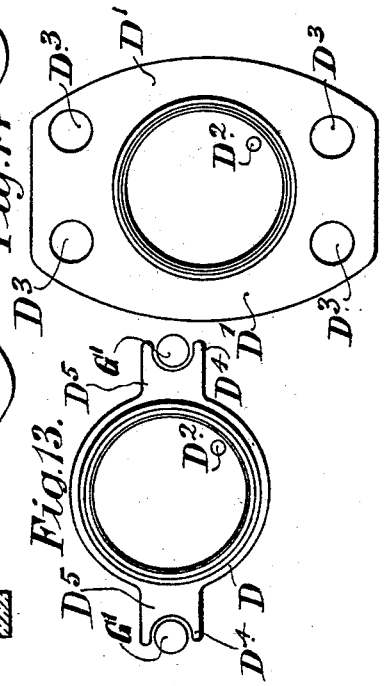

No. 622,872. Patented Apr. 11, 1899.
J. I. THORNYCROFT.
APPARATUS FOR CONDENSING STEAM.
(Application filed Dec. 22, 1897.)
(No Model.) 5 Sheets—Sheet 4.

No. 622,872. Patented Apr. 11, 1899.
J. I. THORNYCROFT.
APPARATUS FOR CONDENSING STEAM.
(Application filed Dec. 22, 1897.)
(No Model.) 5 Sheets—Sheet 5.
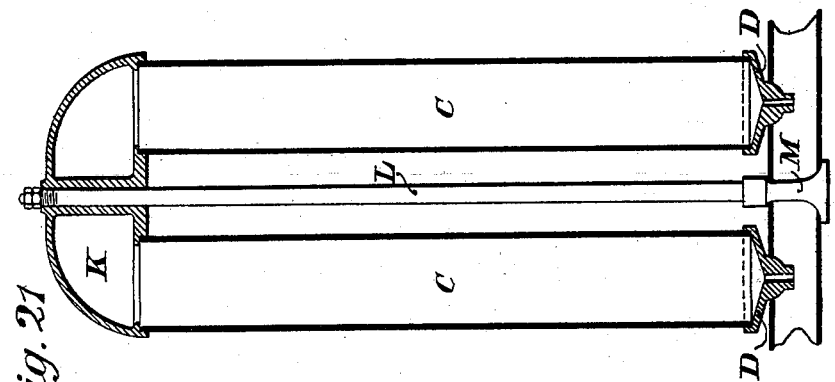
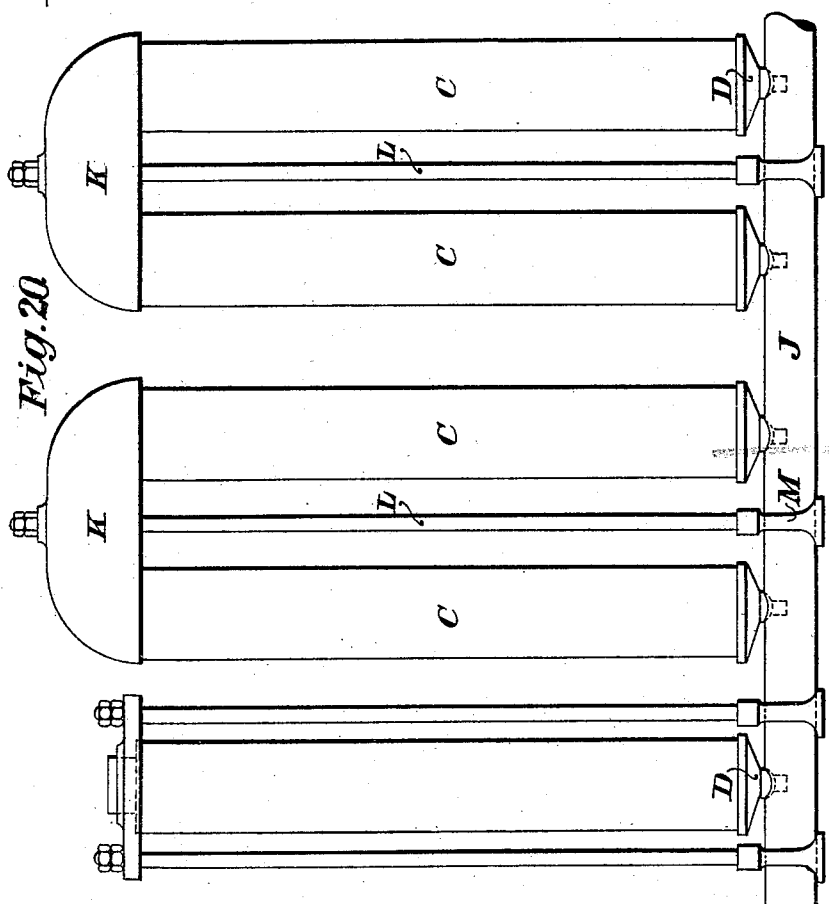

UNITED STATES PATENT OFFICE.

JOHN ISAAC THORNYCROFT, OF LONDON, ENGLAND.

APPARATUS FOR CONDENSING STEAM.

SPECIFICATION forming part of Letters Patent No. 622,872, dated April 11, 1899.

Application filed December 22, 1897. Serial No. 662,997. (No model.)

*To all whom it may concern:*

Be it known that I, JOHN ISAAC THORNYCROFT, a subject of the Queen of Great Britain and Ireland, residing at Chiswick, London, in the county of Middlesex, England, have invented Improvements in Apparatus for Condensing Steam, of which the following is a specification.

This invention has reference to a construction of surface condensers wherein steam can be readily condensed by the action of air coming in contact with steam-containing portions of the apparatus, thereby rendering it suitable for use in steam-propelled vehicles, such as tramway-locomotives and motor-cars running on common roads. Such a condenser, according to this invention, is made with thin tubes of metal that is a good conductor of heat, which tubes are constructed or provided with a series of thin fins or gills that project outward laterally to a distance that is considerable in comparison with the diameter of the tubes, these lateral projections being so arranged that between them spaces are left for the passage of air, which, impinging upon the exposed surfaces, will take up heat from the steam that is in the tubes and so will cause rapid condensation.

Figure 1 of the accompanying illustrative drawings is a side view of a portion of an air-condenser tube according to this invention in process of manufacture, and Fig. 2 is a transverse section thereof. Figs. 3 and 4 are cross-sections of modifications. Fig. 5 is a partial side view of a set of condenser-tubes according to this invention, and Fig. 6 is a corresponding horizontal section of two sets of tubes such as shown in Fig. 5. Fig. 7 is a plan of a condenser constructed of such tubes, and Fig. 8 a section corresponding to the line $a\,b$ thereof. Figs. 9 to 16 are views of details of this condenser, Figs. 9 and 10 being respectively a vertical section and an elevation of a cap-piece, Figs. 11 and 12 an elevation and a vertical section, respectively, of a coupling or connection, Figs. 13 and 14 elevations of an intermediate and a terminal diaphragm, respectively, Figs. 15 and 16 elevations of an intermediate and a terminal coupling-ring, respectively, and Fig. 17 a sectional view of a set of condenser-sections. Figs. 18 and 19 are respectively a plan and a front elevation of a condenser of modified form; and Figs. 20, 21, and 22 are detail views thereof, drawn to a larger scale, Fig. 20 being a side elevation, Fig. 21 a partial vertical longitudinal section, and Fig. 22 a plan, of an inverted junction-piece.

According to this invention each tube A is made with one or more extremely thin flanges B, wide as compared with the diameter of the tube and running the entire length of the tube, these flanges being cut transversely at short intervals into a number of narrow parts B', constituting thin fins or gills, each of which is at its inner end in metallic connection with the tube, thereby forming a series of lateral projections, with spaces between them that will allow currents of air to pass. These narrow pieces are preferably twisted so that a considerable portion of each of them stands at the angle to the line of its junction with the tube, thus presenting efficient surfaces for the air to act against.

The tube A (shown in Figs. 1 and 2) is formed in one with its fins B' from a thin sheet of copper or other metal bent to a tubular form with a flange projecting approximately tangentially on each side of the tube-seam, which is soldered, as shown at $B^2$ in Fig. 2.

It has been found that tubes with small fins or gills such as above described give a much better result than tubes having an equal extent of surface not so subdivided. It will be understood that the surface of each lateral projection constitutes a small area which, in consequence of the arrangement adopted, is traversed by air that has not just previously been flowing over another portion of surface belonging to the same tube.

Figure 1:
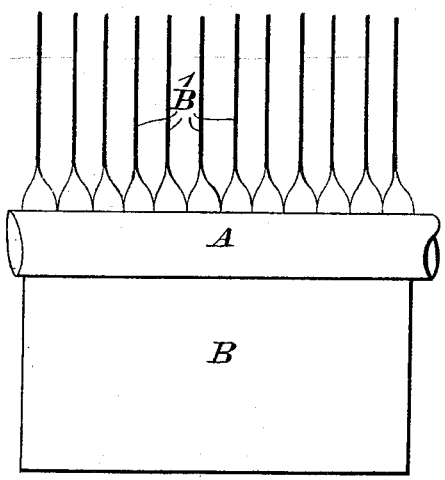
Figures 2, 3, 4:
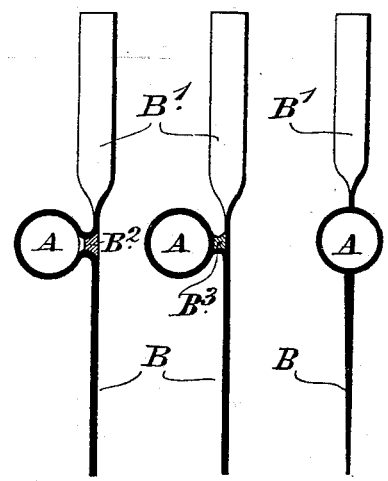
Fig. 3 illustrates a modified construction, in which the fins are made separate from the tube and the two parts are joined by solder, as indicated at $B^3$.
Fig. 4 illustrates a further modification, in which the tube A and fins are made in one piece, the tube being made complete without soldering and the fins being arranged to extend diametrically therefrom and preferably tapered toward their outer edges.
Figure 5:
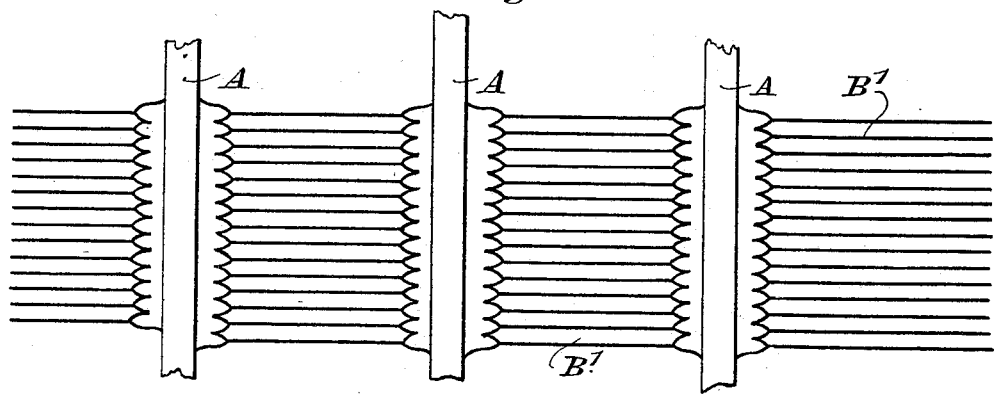
Figure 6:
Figure 18:
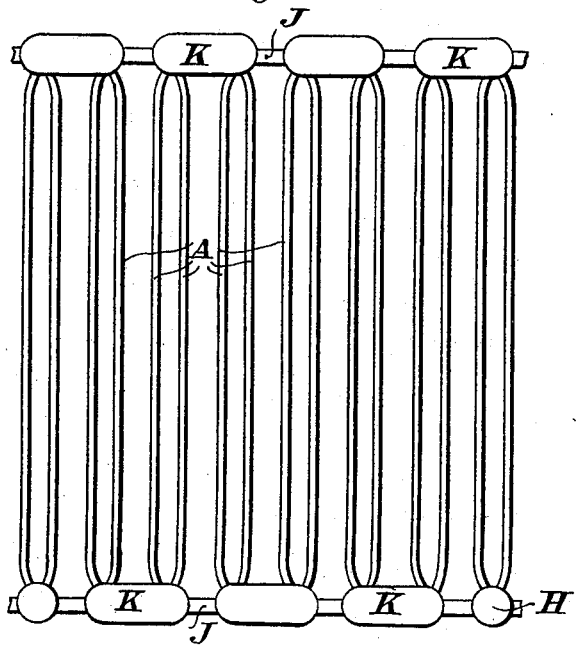
Figure 19:
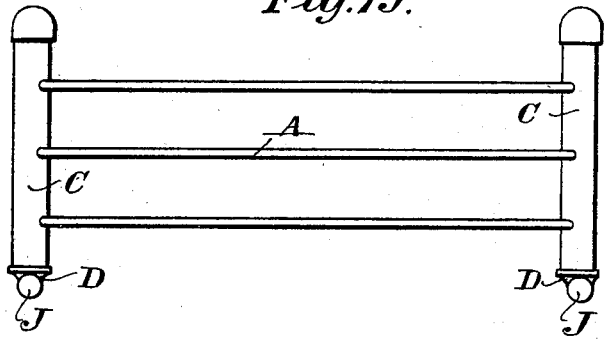

A set of condenser-tubes provided with fins according to this invention may be formed, as shown in Figs. 5 and 6, by soldering simple tubes A to one side of a thin metal plate and making a series of short parallel slits in each part of the plate that lies between adjacent tubes A and at the outer side of each outer tube A and then twisting or bending the strips of metal thus formed to the required angle. Instead of soldering all the tubes to one side of the plate some of them might be joined to one side and the others to the other side, if desired.

Condensers according to this invention can be constructed so that the flow of air may be that due to the passage through the air of vehicles carrying such condensers, or the flow of air may be caused by special apparatus, such as fans, blowers, or exhausters, or by a combination of such means. Also in the improved condensers special provision is sometimes made for the ready and automatic removal of the water of condensation as the steam is condensed.

A convenient arrangement of condenser comprises a number of transversely-arranged tubes having fins or gills, these tubes being connected at their ends in series by longitudinal tubes provided with diaphragms to cause the steam to flow from one longitudinal tube through one series of transverse tubes to the other longitudinal tube and thence back again by another series of transverse tubes, and so on, small holes being formed through the diaphragms to enable the water of condensation to flow along the longitudinal tubes to suitable points, whence it can be conveyed to the feed or water tank. Such an arrangement of condenser is shown in Figs. 7 to 17, inclusive. A A are tubes having fins or gills arranged edge on to the air through which they travel or which passes between them, as above described; but for the sake of clearness the fins or gills are not shown. The tubes are arranged in two rows and are connected at their ends to two longitudinal tubes C, each made up of a number of lengths. The outer ends of the outmost lengths of one of the tubes C are closed by cap-pieces C', (see Figs. 9 and 10,) while those of the other tube C are fitted with inlet and outlet pipe couplings or connections $C^2$. (See Figs. 11 and 12.) When the condenser is placed horizontally, one of the cap-pieces C' on the other tube C is replaced by an outlet-pipe coupling or connection like $C^2$ for running off water of condensation from such tube. The various lengths of the tube C have, as shown in Fig. 7, interposed between them diaphragms D and D', Figs. 13 and 14, and coupling-rings E and F, Figs. 15 and 16. The diaphragms D and D' are formed with small drain-holes $D^2$. The condenser is built up in sections, each of which consists of two short lengths of the tubes C and ten tubes A, which connect these lengths together and are upwardly bent or arched, as shown in Fig. 8, and the ends of which are secured into the lengths of the tubes C. Sets each containing four or more or less of these sections are or may be made up in a manner like or similar to that of the example illustrated by Fig. 17, which represents to an enlarged scale the end shown in the lower part of Fig. 7 of the central set of the condenser. In the end of the section shown in Fig. 17 there is a central diaphragm D, two intermediate rings E, and two terminal diaphragms D', the whole being clamped together by means of nuts G and a pair of long bolts or rods G', which enter at each end diametrically opposite holes $D^3$ in the projecting part of a diaphragm D' and which for the purpose of keeping the holes $D^2$ of the diaphragms D in the proper positions engage in recesses $D^4$, Fig. 13, formed in lugs $D^5$ on the diaphragms D. Each of the other sets contained in the condenser is at its corresponding end like that represented in Fig. 17, except that in lieu of a terminal diaphragm D', an intermediate ring E, an intermediate diaphragm D, an intermediate ring E, and a terminal diaphragm D' there are respectively a terminal ring F, an intermediate diaphragm D, an intermediate ring E, an intermediate diaphragm D, and a tube-coupling $C^2$. On referring to Fig. 7 it will be seen that opposite to each of the terminal diaphragms D' and rings F there are a ring F and a diaphragm D', respectively. Between the middle set and each adjacent set there is interposed a single section $C^X$, it and the adjacent sets of sections being clamped together at each end of the section by a pair of short bolts G'', similar to the bolts G', which pass through the holes in the terminal diaphragm D' and the terminal ring F not occupied by the pairs of bolts G', that serve to hold together the sections of the adjacent sets.

It will be seen from Fig. 7 that the arrangement of diaphragms D and D' and coupling-rings E and F is such that steam admitted to the condenser at H is caused to flow in a zigzag course through the tubes A of all the sections successively, the water of condensation which passes through the holes $D^2$ in the diaphragms escaping at I.

In the modified construction of condenser shown in Figs. 18 to 22, inclusive, the tubes C, that connect in series the transversely-arranged tubes A, having fins or gills, are vertical, the lower ends of each tube C being provided with a funnel-shaped diaphragm D, the contracted outlet portion of which is let into a pipe J, adapted to lead off the water of condensation that passes through the diaphragms. The tubes C on each side of the condenser are connected in pairs at their upper ends by junction-pieces K, (see Figs. 21 and 22,) which are secured by rods L, that are screwed at their lower ends into sleeves M, embracing the pipes J, and are fitted at their upper ends with tightening-nuts, as shown. It will be seen from Fig. 18 that the arrangement is such that steam admitted at H will be caused to flow in a zigzag course through all the sets of transverse tubes A, as in the previously-described arrangement.

What I claim is—

1. A surface-condenser tube having a series of narrow thin metal fins or gills that project outward laterally to a distance that is considerable in comparison with the diameter of the tube, each fin being separated from its adjacent fin and the connection between the tube and the fins being substantially lengthwise of the tube substantially as described.

2. A surface-condenser tube having a series of thin metal fins or gills that project laterally to a distance that is considerable in comparison with the diameter of the tube, each fin being divided from the adjacent fin, and twisted, so that for a portion of its length it stands at an angle to its line of junction with the tube, substantially as described.

3. A surface-condenser tube having in metallic connection therewith a thin metal plate the connection being substantially lengthwise of the tube, and the plate extending outwardly to a distance which is considerable in comparison with the diameter of the tube, said plate being subdivided into a series of narrow fins or gills separated from each other, substantially as described.

4. A surface-condenser tube having in metallic connection therewith a thin metal plate which extends outwardly to a distance which is considerable in comparison with the diameter of the tube, said plate being subdivided into a series of narrow fins or gills, said fins or gills being twisted so that a portion of their length lies at an angle to the line of junction of the plates and the tube, substantially as described.

5. A surface-condenser tube having a series of narrow fins or gills which have a metallic connection with the tube and project outward, angularly to a plane containing the axis and line of connection of the fins or gills and tube, to a distance that is considerable in comparison with the diameter of the tube, substantially as and for the purpose set forth.

6. A surface-condenser tube having a series of narrow metal plates which have a metallic connection with the tube, project outward therefrom to a distance that is considerable in comparison with the diameter of the tube, and have their surfaces near the tube parallel to the axis of the tube and are twisted so that the portions of their surfaces remote from the tube are at an angle to a plane containing the said axis, substantially as and for the purpose set forth.

7. The combination of a metal tube and a thin metal plate subdivided for the greater portion of its width into narrow strips and having a metallic connection with the tube at its unsubdivided portion, the said narrow strips being twisted so that their parts remote from the tube are perpendicular to a plane containing the axis of the tube, substantially as and for the purpose set forth.

8. The combination with a thin metal plate which, with the exception of two or more narrow portions, is subdivided into narrow strips which are twisted near the unsubdivided portions so that for the greater portion of its length the surface of each strip is perpendicular to the unsubdivided portions, of a number of metal tubes which are equal in number to the said unsubdivided portions and have a metallic connection therewith, substantially as and for the purpose set forth.

9. In a condenser the combination with two groups of tubes of relatively small cross-sectional area, the tubes of each group being provided with a series of thin narrow fins or gills which extend outward to a distance that is considerable compared to the diameter of the tubes and which are spaced apart from each other so as to permit air to pass between them, of tubes of relatively large cross-sectional area to which the small tubes are connected, substantially as described.

10. In a condenser the combination with two groups of tubes of relatively small cross-sectional area, the tubes of each group being connected to each other by a series of thin narrow plates which for a part of their length stand at an angle to their line of junction with the tubes, of tubes of relatively large cross-sectional area to which the small tubes are connected, substantially as described.

11. In a condenser the combination with two groups of tubes of relatively small cross-sectional area, the tubes of each group being provided with a series of thin narrow fins or gills which for a part of their length stand at an angle to their line of junction with the tubes, of tubes of relatively large cross-sectional area to which the small tubes are connected, substantially as described.

12. A condenser comprising a plurality of sections, each section consisting of a group of tubes of relatively smaller cross-sectional area, the ends of said tubes being connected to tubes of relatively larger cross-sectional area, said groups of tubes being arranged in pairs, the large tubes of one end of each group being in open connection with each other, and the large tubes at the other end of each group having perforated diaphragms between them, and means for securing together a number of such groups of tubes so arranged, substantially as described.

13. A condenser comprising a number of tubes each having a series of thin fins or gills that project outward laterally to a distance that is considerable in comparison with the diameter of the corresponding tube, said fins or gills being twisted so that a part of each of them stands at an angle to the remaining part thereof, two tubes arranged transversely to, and connected to the opposite ends of the other tubes, and diaphragms arranged to cause steam passing through the condenser to pursue a zigzag course therein, substantially as herein described.

14. A condenser comprising a number of parallel or approximately parallel metal tubes, two tubes arranged transversely to the said parallel tubes with opposite ends of which the said two tubes are connected, and perforated diaphragms arranged to cause steam passing through the condenser to pursue a zigzag course therein but yet to allow the water of condensation to pass along the said two tubes, substantially as herein described.

15. A condenser comprising a number of sections each consisting of two parallel longitudinal tube lengths and a number of tubes arranged transversely to, and connecting together the said two tube lengths, a number of diaphragms placed between adjacent longitudinal tube lengths, and means for clamping the said sections together, the said diaphragms being arranged to cause steam passing through the condenser to pursue a zigzag course therein, substantially as herein described.

16. A condenser comprising a number of sections each consisting of two parallel longitudinal tube lengths and a number of tubes arranged transversely to, and connecting together, the said two tube lengths, a number of coupling-pieces some provided with diaphragms and some without diaphragms, and bolts and nuts for clamping the sections together, some of the sections being clamped together into sets, each set being secured together at each end by a pair of the said bolts whose ends enter diametrically opposite holes in each of two of the said coupling-pieces arranged at the outer ends of the outmost tube lengths of the set, each two adjacent sets having between them a single section and being clamped together at each end by a pair of bolts whose ends pass through another pair of diametrically opposite holes in each of the adjacent end coupling-pieces of the two sets, and the coupling-pieces having diaphragms being arranged to cause steam passing through the condenser to pursue a zigzag course, substantially as herein described.

In testimony whereof I have signed my name to this specification in the presence of two subscribing witnesses.

JOHN ISAAC THORNYCROFT.

Witnesses:
    EDMUND S. SNEWIN,
    WM. O. BROWN.